(12) United States Patent
Liu

(10) Patent No.: US 8,307,290 B2
(45) Date of Patent: Nov. 6, 2012

(54) REMOTE CONTROL DEVICE AND METHOD

(75) Inventor: Yi-Li Liu, Vancouver (CA)

(73) Assignee: Aten International Co., Ltd., Shijr (TW)

( * ) Notice: Subject to any disclaimer, the term of this patent is extended or adjusted under 35 U.S.C. 154(b) by 1647 days.

(21) Appl. No.: 11/319,116

(22) Filed: Dec. 27, 2005

(65) Prior Publication Data

US 2007/0150818 A1 Jun. 28, 2007

(51) Int. Cl.
*G06F 3/00* (2006.01)
*G06F 3/048* (2006.01)

(52) U.S. Cl. ........................................ 715/740; 715/810

(58) Field of Classification Search .................. 715/740, 715/810
See application file for complete search history.

(56) References Cited

U.S. PATENT DOCUMENTS

| | | | |
|---|---|---|---|
| 6,378,009 B1 | 4/2002 | Pinkston, II et al. | |
| 7,441,063 B2 * | 10/2008 | Tseng et al. | 710/305 |
| 7,822,901 B2 * | 10/2010 | Tseng et al. | 710/305 |
| 7,917,674 B2 * | 3/2011 | Lin et al. | 710/73 |
| 2005/0052465 A1 * | 3/2005 | Moore et al. | 345/603 |
| 2005/0132403 A1 * | 6/2005 | Lee et al. | 725/38 |
| 2007/0136498 A1 * | 6/2007 | Tseng et al. | 710/73 |
| 2008/0036761 A1 * | 2/2008 | Mazzanti | 345/420 |
| 2008/0062121 A1 * | 3/2008 | Huang et al. | 345/156 |

OTHER PUBLICATIONS

"KVM Swtich", http://www.wikipedia.org/wiki/KVM_switch.*
"KVM Switch", http://www.webopedia.com/TERM/K/KVM_switch.html.*

* cited by examiner

*Primary Examiner* — Doug Hutton, Jr.
*Assistant Examiner* — Soumya Dasgupta
(74) *Attorney, Agent, or Firm* — Chen Yoshimura LLP

(57) ABSTRACT

The present invention discloses a remote control device. Via the present remote control device, a remote computing device can operate a plurality of computing devices and further administrate the whole system constituted by the plurality of computing devices and a KVM switch via a network. The remote control device and the method used therein firstly generates a menu in response to a request from the remote computing device, and the menu has at least one option for a remote control action. The menu is then transmitted to the remote computing device via the network. Once a cursor position representing a chosen option is received from the remote computing device via the network, the cursor position corresponds to the option. The remote control action is carried out according to the cursor position.

18 Claims, 6 Drawing Sheets

REMOTE CONTROL DEVICE AND METHOD

BACKGROUND

1. Field of Invention

The present invention relates to a remote control system. More particularly, the present invention relates to a remote control device capable of carrying out a remote control action in response to a cursor position transmitted via the network.

2. Description of Related Art

With the rapid development in information technology, computers and their peripherals have become very popular. Typically, each computer is equipped with one console device including a keyboard, a mouse and a monitor. However, this kind of configuration is a waste of money and occupies too much space if there is only one user to manipulate these computers. Referring to FIG. 1, a keyboard-video-mouse (KVM) switch 100 is therefore proposed to use a single console device 114 to manage several computers 112. Using the KVM switch 100 can reduce hardware cost and decreases waste of space while simultaneously conquering the problem of compatibility between different interfaces.

In some applications, it is desirable to interact with the KVM switch 100 from a remote computing device 128 via a network 118. As disclosed in the U.S. Pat. No. 6,378,009, a user at the remote computing device 128 submits an instruction, e.g. a switch information, to operate the KVM switch 100, for example, to switch to another computer, monitor the status of the KVM switch 100, or manage the KVM switch 100. However, the switch information transmitted from the remote computing device 128 typically contains much information for the foregoing action, which consumes a lot of transmission bandwidth when the instruction is updated or refreshed. Moreover, it is not secure enough to prevent someone intentionally stealing the information contained in the instruction during the conventional transmission of the instruction, which is especially worrisome for events regarding confidential or sensitive information.

SUMMARY

It is therefore an aspect of the present invention to provide a remote control method, which only transmits a corresponding cursor position rather than an instruction having much information, thus simplifying the transmission of the remote control method.

According to one preferred embodiment of the present invention, the remote control method firstly generates a menu in response to a request from a remote computing device, and the menu has at least one option for a remote control action. The menu is then transmitted to the remote computing device via a network. A cursor position is received from the remote computing device via the network, and the cursor position corresponds to the option. The remote control action is carried out according to the cursor position.

According to another preferred embodiment of the present invention, the remote control method firstly provides a menu to a remote computing device via a network, and the menu has at least one option for a remote control action. A cursor position is received from the remote computing device via the network, and the cursor position corresponds to the option. The remote control action is carried out according to the cursor position.

It is another aspect of the present invention to provide a remote control device, which can recognize a cursor position as a remote control action corresponding to an option at which the cursor is positioned, thus improving the performance and enhancing the security of remote control transmission.

According to another preferred embodiment of the present invention, the remote control device has a menu generator, a network interface circuit and a processor. The menu generator generates a menu in response to a request from a remote computing device, and the menu has at least one option for a remote control action. The network interface circuit is coupled to the menu generator, and transmits the menu to the remote computing device via a network. The network interface circuit also receives a cursor position from the remote computing device via the network, and the cursor position corresponds to the option. The processor is coupled to the menu generator and the network interface circuit and carries out the remote control action according to the cursor position.

It is still another aspect of the present invention to provide a KVM switch, which supports the remote control from a remote computing device and carries out a remote control action according to a cursor position from the remote computing device, thus extending the applications of the KVM switch and lessening the load of the remote computing device.

According to another preferred embodiment of the present invention, the KVM switch has a computer interface, a console interface, a menu generator, a network interface circuit, and a processor. The computer interface is capable of connection to at least one computing device. The console interface is capable of connection to at least one console device. The menu generator generates a menu having at least one option for a remote control action. The network interface circuit is coupled to the menu generator and transmits the menu to the remote computing device via a network. The network interface circuit also receives a cursor position from the remote computing device via the network, and the cursor position corresponds to the option. The processor is coupled to the menu generator, the computer interface, the console interface and the network interface circuit, and routes paths among the computing device, the console device and the remote computing device. The processor carries out the remote control action according to the cursor position.

It is to be understood that both the foregoing general description and the following detailed description are examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
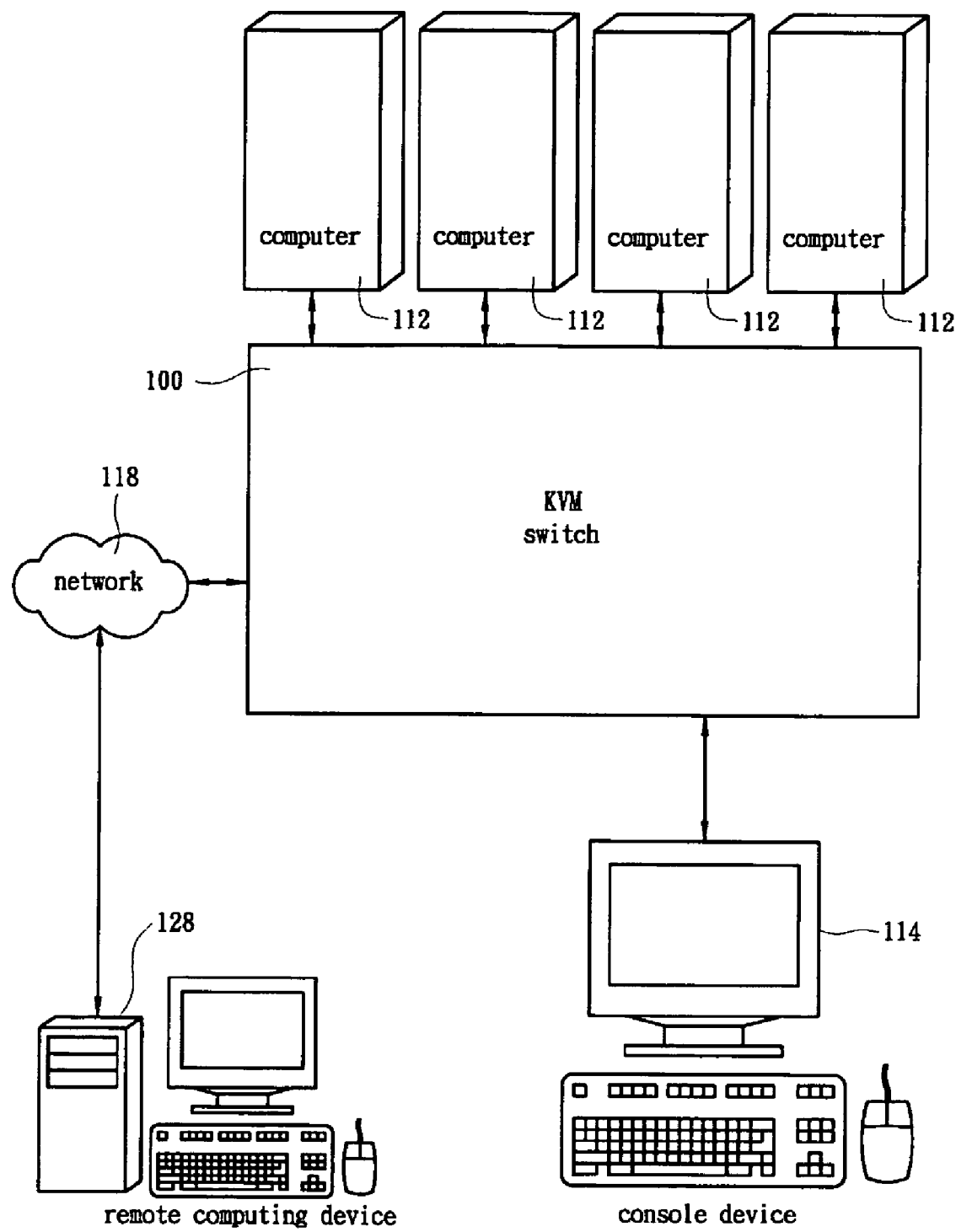
FIG. 1 is a schematic view of a conventional KVM switch connecting several computers and a console device.

Reference will now be made in detail to the preferred embodiments of the present invention, examples of which are illustrated in the accompanying drawings. Wherever possible, the same reference numbers are used in the drawings and the description to refer to the same or like parts.

The present invention discloses a remote control device. Via the present remote control device, one or more than one remote computing device can operate a plurality of computing devices and further administrate the whole system constituted by the plurality of computing devices and a KVM switch via a network.

The present invention uses a cursor position corresponding to an option for a remote control action to replace the conventional instruction containing much information. Therefore, the present invention can simplify the process, improves the performance and enhances the security of remote control transmission.

Figure 2A:
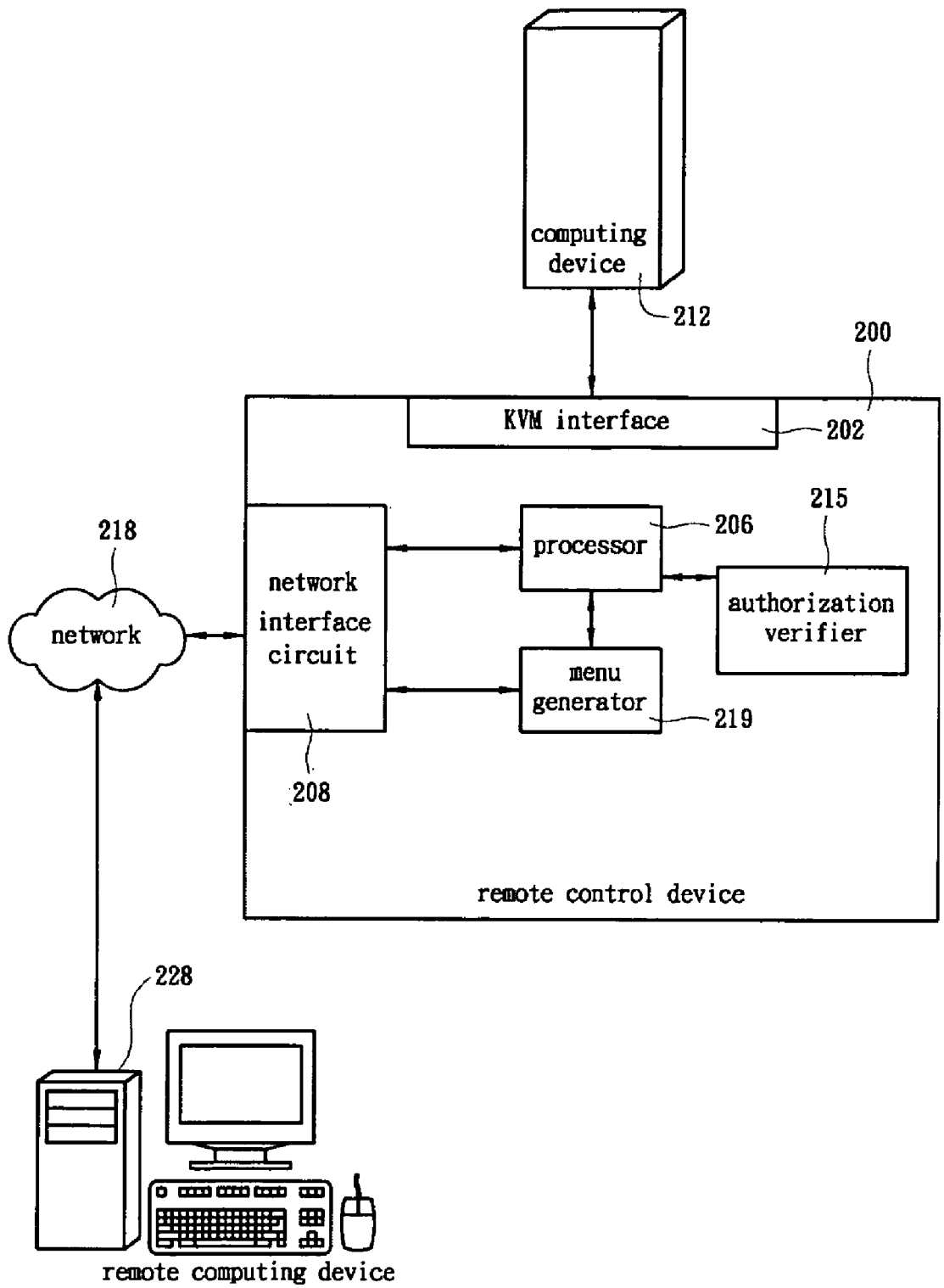
FIG. 2A is a functional block diagram of one preferred embodiment of the present invention.
Figure 3:
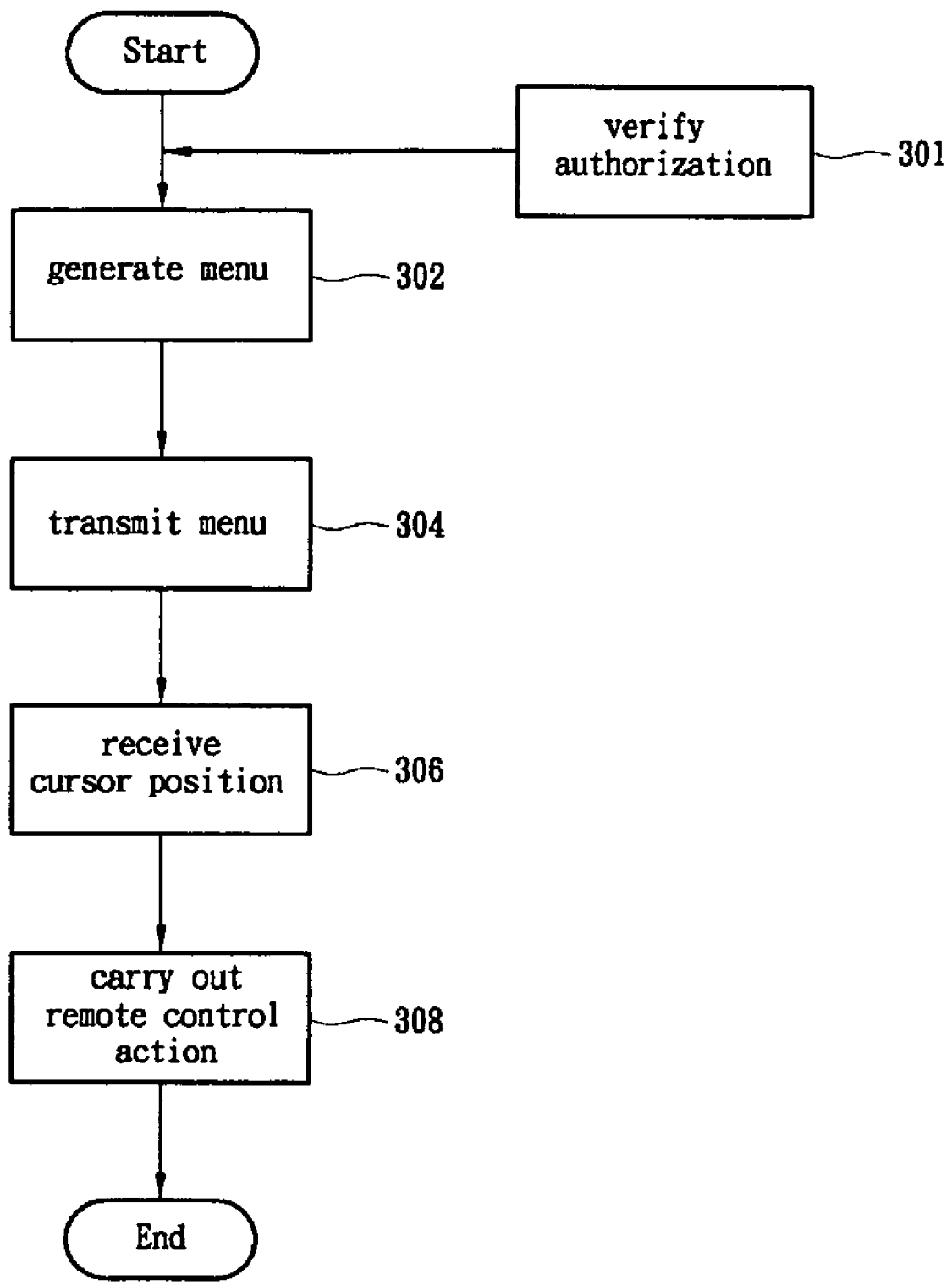
FIG. 3 is a flow chart of one preferred embodiment of the present invention.

FIG. 2A is a functional block diagram of one preferred embodiment of the present invention, and FIG. 3 is a flow chart of one preferred embodiment of the present invention. The following descriptions are made with references to FIG. 2A and FIG. 3.

A remote control device 200 includes a menu generator 219, a network interface circuit 208 and a processor 206. The menu generator 219 generates a menu in response to a request from a remote computing device 228, and the menu has at least one option for a remote control action. The network interface circuit 208 is coupled to the menu generator 219 and transmits the menu to the remote computing device 228 via a network 218. The processor 206 is coupled to the menu generator 219 and the network interface circuit 208. Once the network interface circuit 208 receives a cursor position representing the chosen option shown on the menu from the remote computing device 228 via the network 218, the processor 206 corresponds to the option based on the cursor position. That is, the processor 206 carries out the remote control action according to the cursor position, instead of the switch information.

In another aspect, a menu is firstly generated in response to a request from a remote computing device 228 (step 302), wherein the menu has at least one option for a remote control action. The menu is then transmitted to the remote computing device 228 via a network 218 (step 304). A cursor position is received from the remote computing device 228 via the network 218 (step 306), and the cursor position corresponds to the option. The remote control action is carried out according to the cursor position (step 308).

According to another preferred embodiment, the menu displayed on the remote computing device 228, such as an OSD menu, can be generated by the remote computing device 228 with a suitable software executed or a suitable hardware configured thereon. Accordingly, the method firstly provides a menu to a remote computing device via a network, and the menu has at least one option for a remote control action. A cursor position is received from the remote computing device via the network, and the cursor position corresponds to the option. The remote control action is carried out according to the cursor position.

The remote computing device 228 can be a server, a workstation, a desktop personal computer, a notebook computer or the like which can parse packets received from the network 218 and transmit the cursor position in a packet format via the network 218. The network 218 can be a local area network (LAN), a wireless area network (WAN) or other communication network.

Figure 2B:
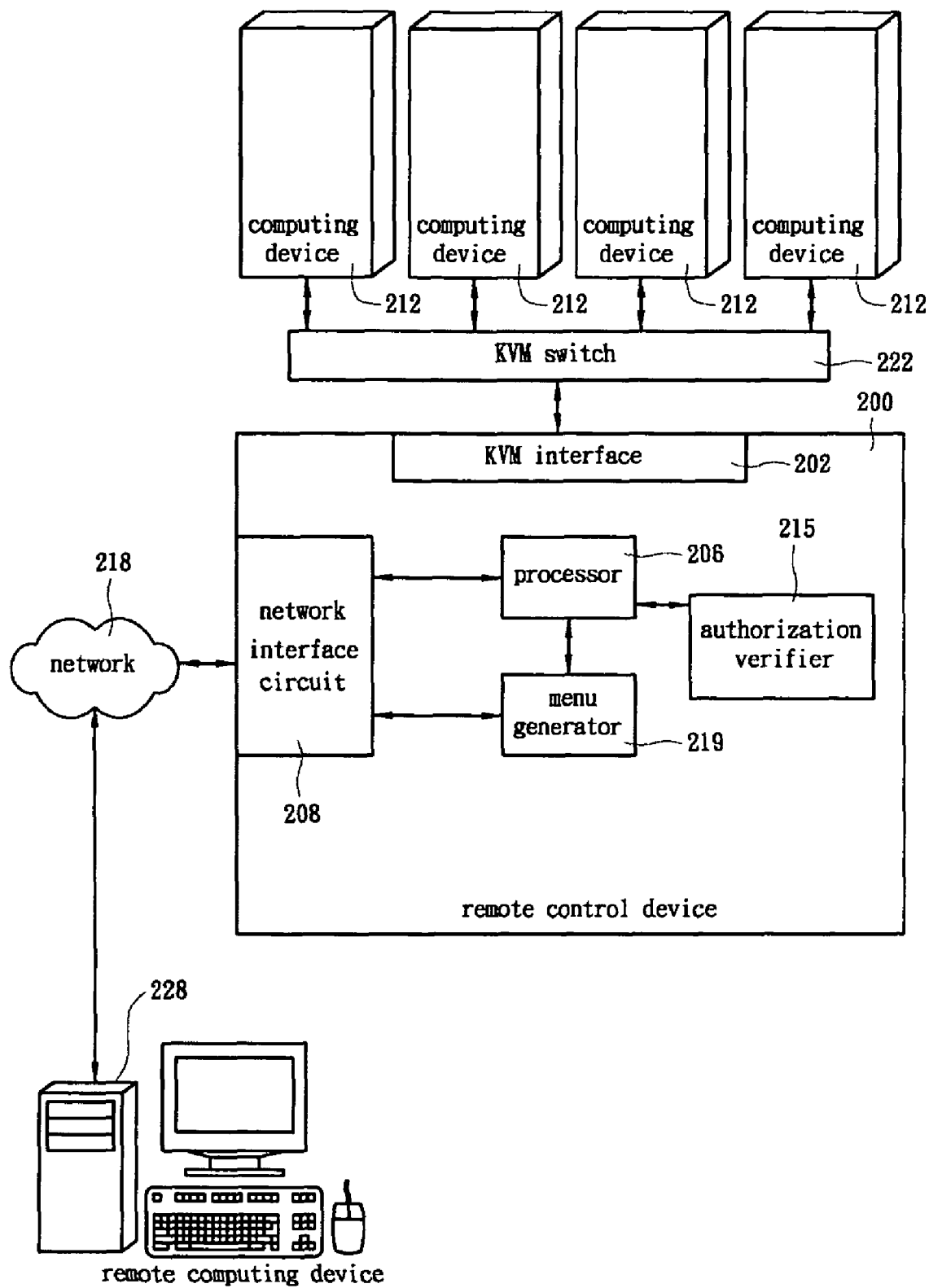
FIG. 2B is a functional block diagram of another preferred embodiment of the present invention.

More particularly, the remote control device 200 further includes a KVM interface 202 coupled to the processor 206, and the KVM interface 202 is capable of connection to at least one computing device 212. Alternatively, the remote control device 200 can be coupled to a plurality of computing devices, for example, via a KVM switch. FIG. 2B is a functional block diagram of another preferred embodiment of the present invention. A KVM switch 222 is connected to the KVM interface 202 of the remote control device 200, for being capable of connection to a plurality of computing devices 212. As a result, a user or an administrator from the remote computing device 228 can access or operate the plurality of computing devices 212 via both the remote control device 200 and the KVM switch 222.

The menu is generated with reference to a connection between the computing device 212 and the remote control device 200. In some other embodiments, the remote control device 200 can be connected with more than one computing devices 212, for example, by extending with a KVM switch capable of connections to several computing devices 212.

In the preferred embodiment, the menu generator 219 can be an OSD generator, which may present the menu in an OSD form, e.g. an OSD menu. The cursor position can be indicated by any cursor control device, such as a mouse (MS), a touch pad, a track ball or a keyboard (KB) connected to the remote computing device 228. Moreover, the remote control device 200 further has an authorization verifier 215 coupled to the processor 206, which is used to verify authorization of the remote computing device 228; more precisely, verifying authorization of the user who operates the remote computing device 228 (step 301). In this case, the menu generator 219 generates the menu according to the verified authorization of the remote computing device 228.

That is, the content of the menu can be different and changed by who operates the remote computing device 228, such as a guest, a user, an administrator or someone with other class. For example, when the remote computing device 228 is operated by a user, the menu is generated with a content granted to the normal class, which permits the normal user to access the computing device 212 only; when the remote computing device 228 is operated by a system administrator, the menu is generated with a content granted to the administration class, which permits the system administrator to access the computing device 212 and even manage or control the whole remote control device 200. Besides the foregoing normal and administration classes, other classes or detailed classifications also can be made with different functions and capabilities as needed.

The remote control action, which is transmitted from the remote computing device 228 and received by the remote control device 200, can be an administration action, a monitor action or a switching action, depending on to what class the user at the remote computing device 228 belongs. The user of the normal class, the normal user, may be permitted only the switching action which can access the computing device 212. Alternatively, the user of the administration class, the system administrator, may be permitted all of or more than the three actions which can access the computing device 212, check the status of the remote control device 200, manage the remote control device 200, and other functions, such as limiting activities of the normal user and controlling the remote computing device 228.

Another embodiment of the present invention is implemented as a KVM switch, which supports the remote control from a remote computing device via the network, particularly carrying out a remote control action according to a cursor position from the remote computing device. That is, in addition to the above-mentioned remote control device, the remote control method can be applied to the KVM switch by some modifications.

Figure 4:
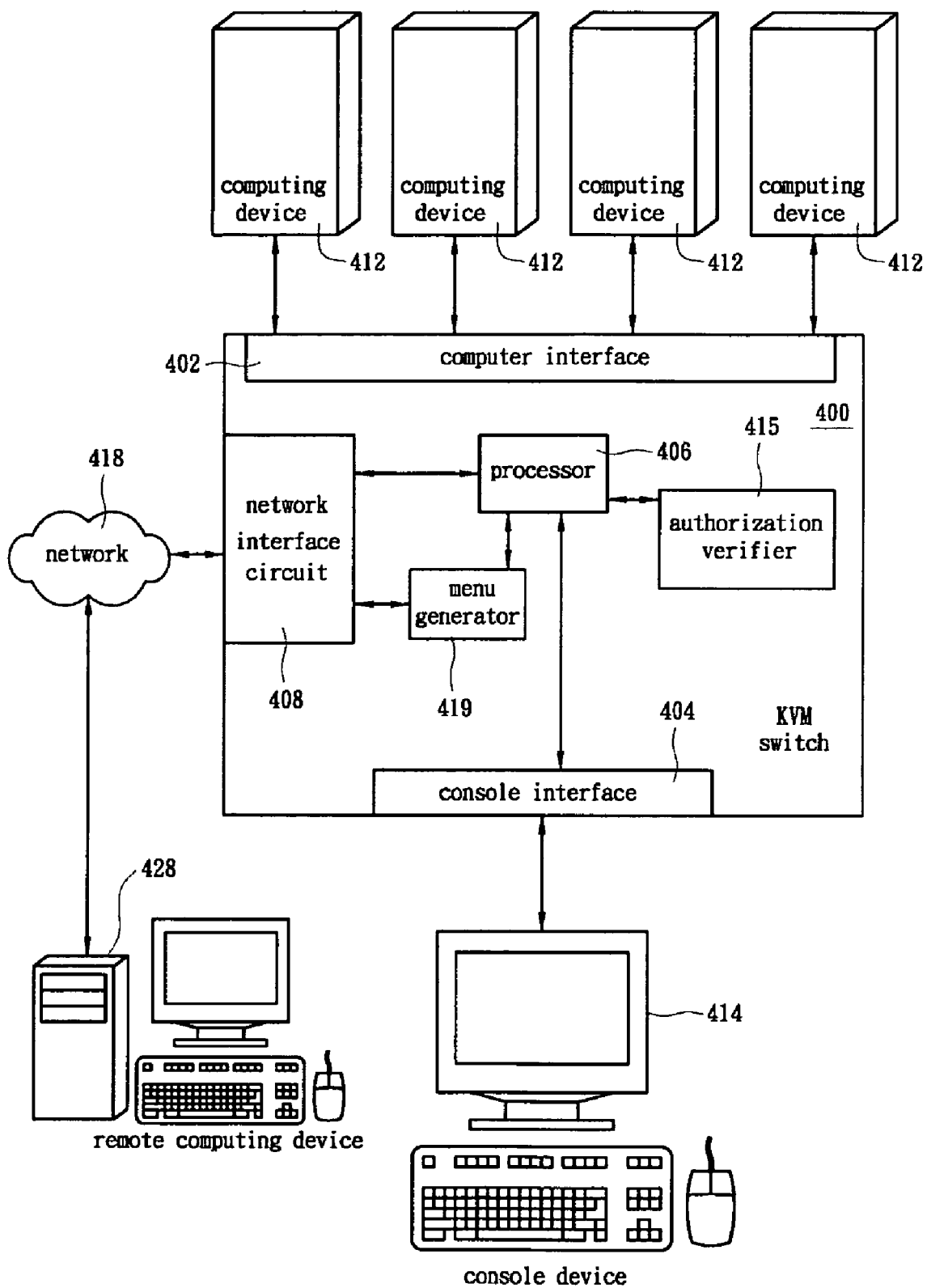
FIG. 4 is a functional block diagram of another preferred embodiment of the present invention.

FIG. 4 is a functional block diagram of another preferred embodiment of the present invention, especially a KVM switch with remote control application. The KVM switch 400 has a computer interface 402, a console interface 404, a menu generator 419, a network interface circuit 408, and a processor 406. The computer interface 402 is capable of connection to at least one computing device 412. The console interface 404 is capable of connection to at least one console device 414. The menu generator 419 generates a menu having at least one option for a remote control action.

The network interface circuit 408 is coupled to the menu generator 419 and transmits the menu to the remote computing device 428 via a network 418. The network interface circuit 408 also receives a cursor position from the remote computing device 428 via the network 418, wherein the cursor position corresponds to the option. The processor 406 is coupled to the menu generator 419, the computer interface 402, the console interface 404 and the network interface circuit 408 and routes paths among the computing device 412, the console device 414 and the remote computing device 428. The processor 406 carries out the remote control action according to the cursor position.

The console device 414 typically includes manipulating devices (such as a keyboard or a mouse) and a display device (such as a CRT display or an LCD display). The remote computing device 428 can be a server, a workstation, a desktop personal computer, a notebook computer or the like which can access the network 418 and act as a terminal. The network 418 can be a local area network (LAN), a wireless area network (WAN) or other communication network.

More particularly, the menu is generated with reference to the connections of the KVM switch 400, such as the connections to the computing device 412, the console device 414 and/or the remote computing device 428. In the preferred embodiment, the menu generator 419 can be an OSD generator, which may present the menu in an OSD form, e.g. an OSD menu. The cursor position can be indicated by a mouse, a touch pad, a track ball or a keyboard connected to the remote computing device 428. Moreover, the KVM switch 400 further has an authorization verifier 415 coupled to the processor 406, which is used to verify authorization of the remote computing device 428; more precisely, verifying authorization of the user who operates the remote computing device 428. In this case, the menu generator 419 generates the menu according to the verified authorization of the remote computing device 428.

That is, the content of the menu can be different and changed by who operates the remote computing device 428, such as a guest, a user, an administrator or someone with other class. For example, when the remote computing device 428 is operated by a user, the menu is generated with a content granted to the normal class, which permits the normal user to access the computing device 412 only; when the remote computing device 428 is operated by a system administrator, the menu is generated with a content granted to the administration class, which permits the system administrator to access the computing device 412 and even manage or control the whole KVM switch 400. Besides the foregoing normal and administration classes, other classes or detailed classification can also be made with different functions and capabilities as needed.

The remote control action, which is transmitted from the remote computing device 428 and received by the KVM switch 400, can be an administration action, a monitor action or a switching action, depending on to what class the user at the remote computing device 428 belongs. The user of the normal class, the normal user, may be permitted only the switching action which can selectively access one or more of the computing devices 412. Alternatively, the user of the administration class, the system administrator, may be permitted all of or more than the three actions which can access the computing devices 412, check the status of the KVM switch 400, manage the KVM switch, and other functions such as limiting activities of the user operating the console device 414 or controlling the remote computing device 428.

Figure 5:
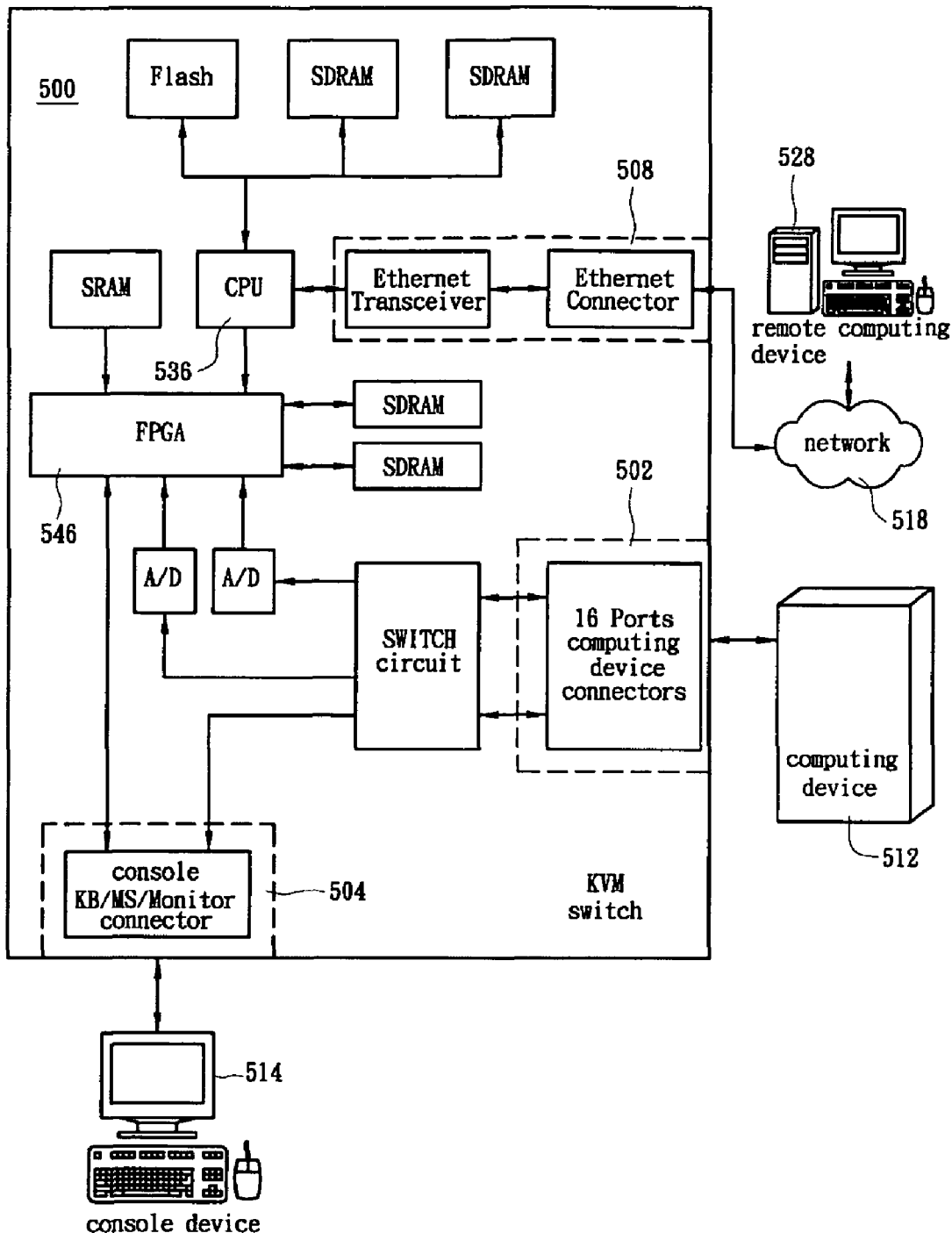
FIG. 5 is a schematic view of another preferred embodiment of the present invention.

FIG. 5 is a schematic view of another preferred embodiment of the present invention, illustrating the OSD menu generations of the console device 514 and the remote computing device 528. A OSD menu, which is transmitted to the console device 514 through the console interface 504 (e.g. an console keyboard/mouse/monitor connector), is generated by a central processor unit (CPU) 536 and a field-programmable gate array (FPGA) 546. The CPU 536 is used to generate OSD images of the OSD menu for the console device 514, and the FPGA 546 is used to overlay the OSD images on the original images received from the computing device 512 through the computer interface 502 (e.g. 16-port computing device connectors). In addition, according to other preferred embodiments, the field-programmable gate array (FPGA) 546 can be replaced by an application specific integrated circuit (ASIC), a complex programmable logic device (CPLD), other programmable chip or their combination.

An OSD menu for the remote computing device 528 is transmitted to the remote computing device 528 through the network interface circuit 508 (e.g. an Ethernet transceiver and an Ethernet connector). OSD images of the OSD menu for the remote computing device 528 are generated by the CPU 536 and transmitted to the remote computing device 528 by the Ethernet transceiver after suitable compression.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A remote control method, comprising the steps of:
generating an OSD menu in response to a request from a remote computing device, wherein the OSD menu has at least one option for a remote control action;
transmitting the OSD menu to the remote computing device via a network;
receiving a cursor position from the remote computing device via the network, wherein the cursor position corresponds to and represents the chosen option; and
carrying out the remote control action according to the cursor position.

2. The remote control method as claimed in claim 1, wherein the OSD menu is generated with reference to a connection between a computing device and a remote control device.

3. The remote control method as claimed in claim 1, wherein the cursor position is indicated by a mouse, a touch pad, a track ball or a keyboard connected to the remote computing device.

4. The remote control method as claimed in claim 1, further comprising:
verifying authorization of the remote computing device before generating the OSD menu, wherein the OSD menu is generated according to the verified authorization of the remote computing device.

5. The remote control method as claimed in claim 1, wherein the remote control action is an administration action, a monitor action or a switching action.

6. A remote control method, comprising the steps of:
   providing an OSD menu to a remote computing device via a network, wherein the OSD menu has at least one option for a remote control action;
   receiving a cursor position from the remote computing device via the network, wherein the cursor position corresponds to and represents the chosen option; and
   carrying out the remote control action according to the cursor position.

7. The remote control method as claimed in claim 6, wherein the OSD menu is generated by a software executed on the remote computing device.

8. A remote control device, comprising:
   an OSD menu generator arranged to generate an OSD menu in response to a request from a remote computing device, wherein the OSD menu has at least one option for a remote control action;
   a network interface circuit coupled to the OSD menu generator and arranged to transmit the OSD menu to the remote computing device via a network and receive a cursor position from the remote computing device via the network, wherein the cursor position corresponds to and represents the chosen option; and
   a processor coupled to the OSD menu generator and the network interface circuit and arranged to carry out the remote control action according to the cursor position.

9. The remote control device as claimed in claim 8, further comprising: a KVM interface coupled to the processor and capable of connection to a KVM switch or a computing device.

10. The remote control device as claimed in claim 9, wherein the OSD menu is generated with reference to the connection between the remote control device and the KVM switch or the computing device.

11. The remote control device as claimed in claim 8, wherein the cursor position is indicated by a mouse, a touch pad, a track ball or a keyboard connected to the remote computing device.

12. The remote control device as claimed in claim 8, further comprising: an authorization verifier coupled to the processor and arranged to verify authorization of the remote computing device, wherein the OSD menu is generated by the OSD menu generator according to the verified authorization of the remote computing device.

13. The remote control device as claimed in claim 8, wherein the remote control action is an administration action, a monitor action or a switching action.

14. A KVM switch, comprising:
   a computer interface capable of connection to at least one computing device;
   a console interface capable of connection to at least one console device;
   an OSD menu generator arranged to generate an OSD menu having at least one option for a remote control action;
   a network interface circuit coupled to the OSD menu generator and arranged to transmit the OSD menu to the remote computing device via a network and receive a cursor position from the remote computing device via the network, wherein the cursor position corresponds to and represents the chosen option; and
   a processor coupled to the OSD menu generator, the computer interface, the console interface and the network interface circuit and arranged to route paths among the computing device, the console device and the remote computing device, wherein the processor is arranged to carry out the remote control action according to the cursor position.

15. The KVM switch as claimed in claim 14, wherein the OSD menu is generated with reference to the connections of the computing device, the console device and the remote computing device.

16. The KVM switch as claimed in claim 14, wherein the cursor position is indicated by a mouse, a touch pad, a track ball or a keyboard connected to the remote computing device.

17. The KVM switch as claimed in claim 14, further comprising: an authorization verifier coupled to the processor and arranged to verify authorization of the remote computing device, wherein the OSD menu is generated by the OSD menu generator according to the verified authorization of the remote computing device.

18. The KVM switch as claimed in claim 14, wherein the remote control action is an administration action, a monitor action or a switching action.

* * * * *